(12) United States Patent
Chang et al.

(10) Patent No.: US 9,614,582 B2
(45) Date of Patent: Apr. 4, 2017

(54) DYNAMIC RATE ADAPTATION METHODS IN A VECTORED G.FAST SYSTEM

(71) Applicant: Metanoia Communications Inc., Hsinchu (TW)

(72) Inventors: Chun-Che Chang, Hsinchu (TW); Sam Mungall, Hsinchu (TW); Tien-Ke Huang, Hsinchu (TW)

(73) Assignee: METANOIA COMMUNICATIONS INC., Hsinchu (TW)

( * ) Notice: Subject to any disclaimer, the term of this patent is extended or adjusted under 35 U.S.C. 154(b) by 86 days.

(21) Appl. No.: 14/271,602

(22) Filed: May 7, 2014

(65) Prior Publication Data

US 2014/0334283 A1 Nov. 13, 2014

Related U.S. Application Data

(60) Provisional application No. 61/820,673, filed on May 7, 2013, provisional application No. 61/822,431, filed on May 12, 2013.

(51) Int. Cl.
*H04B 3/32* (2006.01)
*H04M 11/06* (2006.01)
*H04M 3/30* (2006.01)
*H04M 3/34* (2006.01)

(52) U.S. Cl.
CPC ............ *H04B 3/32* (2013.01); *H04M 3/304* (2013.01); *H04M 11/062* (2013.01); *H04M 3/34* (2013.01)

(58) Field of Classification Search
CPC ....... H04B 3/32; H04M 3/304; H04M 11/062; H04M 3/34
See application file for complete search history.

(56) References Cited

U.S. PATENT DOCUMENTS

| | | | |
|---|---|---|---|
| 2004/0174808 A1* | 9/2004 | Bolinth | H04L 5/0094 370/206 |
| 2006/0039456 A1* | 2/2006 | Bostoen et al. | 375/222 |
| 2009/0154927 A1* | 6/2009 | Oksman | H04L 5/0037 398/76 |
| 2011/0051906 A1* | 3/2011 | Cioffi et al. | 379/32.04 |
| 2013/0279687 A1* | 10/2013 | Wei | 379/350 |

* cited by examiner

*Primary Examiner* — Ian N Moore
*Assistant Examiner* — Justin T Van Roie
(74) *Attorney, Agent, or Firm* — Han IP Corporation; Andy M. Han

(57) ABSTRACT

Various examples of mechanisms, systems, methods, techniques and devices for dynamic rate adaptation in a vectored G.fast (G.9701) system are described. A first communication device may perform estimation of a residual noise to derive signal-to-noise ratio (SNR) loss for each carrier of one or more carriers with respect to a transmitting port of the first communication device. The residual noise may be an increased noise expected to be experienced by a second communication device when one or more other ports in a vectored group of a plurality of ports of the first communication device are switched off. The first communication device may adapt to the residual noise during time slots of one or more downstream symbol positions where the one or more other ports in the vectored group are switched off by dynamically changing bit-loading.

14 Claims, 18 Drawing Sheets

DYNAMIC RATE ADAPTATION METHODS IN A VECTORED G.FAST SYSTEM

CROSS REFERENCE TO RELATED PATENT APPLICATION

The present disclosure is a Non-Provisional, and claims the priority benefit, of U.S. Patent Application No. 61/820,673, filed on 7 May 2013, and U.S. Patent Application No. 61/822,431, filed on 12 May 2013, which applications are herein incorporated by reference.

TECHNICAL FIELD

The present disclosure generally relates to the field of digital communication and, more particularly, to an orthogonal frequency-division multiplexing (OFDM) communication system.

BACKGROUND

Depending on the supported standard, a digital subscriber line (DSL) system may be denoted as an xDSL system where "x" may indicate any DSL standard. For instance, "x" may stand for "A" in ADSL2 or ADSL2+ systems, "V" in VDSL or VDSL2 systems, or "F" in G.fast systems. When a transceiver is located at an operator end of the DSL system, the transceiver may be referred to as an xTU-O. On the other hand, when a transceiver is located at a remote or user end (e.g., a customer premise equipment, or CPE), the transceiver may be referred to as an xTU-R. For example, if the DSL system is a G.fast system, a transceiver at an operator side may be referred to as a G.fast transceiver unit at an operator side (FTU-O). Similarly, in the G.fast system, a CPE transceiver may be referred to as a FTU at a remote terminal (FTU-R).

Extremely high crosstalk level in a multi-port G.fast system tends to make it very difficult to optimize the power consumption at the FTU-O side (e.g., central office of a service provider). A port with no payload data to send in the downstream direction still needs to transmit crosstalk information to aid other ports in a vectored group, otherwise signal-to-noise ratio (SNR) degradation and consequently error would occur on the transmitting ports. Up to this point little is known about the real channels a G.fast system is to encounter. Different length in the highly coupled region (proximal region or bundle) can make big difference in crosstalk, where the amount of crosstalk spans from being negligible to being very severe.

For loops with medium-to-severe crosstalk, there are techniques that provide some compensation at the FTU-O side. The problem with these techniques is that there is trade-off between complexity and accuracy, and hence some of such techniques cannot cancel the impact of crosstalk completely. Besides, existing techniques tend to deteriorate at high frequency regions (e.g., greater than 80 MHz). Before deployment, it is difficult to predict the effectiveness of these techniques, and therefore a flexible framework to incorporate with residual crosstalk noise is in need.

Moreover, existing techniques about crosstalk reduction only calculate channel capacity and treat the difference of the resulting capacity to the perfect one as performance loss. This, however, may not work in a real system without switching to a new bit-loading table designed for the degraded SNR.

The complexity of these compensation techniques is another concern, and hence a flexible framework that can incorporate future upgrades is desired.

SUMMARY

Various embodiments of mechanisms, systems, methods, techniques and devices for dynamic rate adaptation methods in a vectored G.fast system are disclosed herein.

In one aspect, a method may include a first communication device performing estimation of a residual noise to derive signal-to-noise ratio (SNR) loss for each carrier of one or more carriers with respect to a transmitting port of the first communication device. The residual noise may be an increased noise experienced by a second communication device when one or more other ports in a vectored group of a plurality of ports of the first communication device are switched off. The method may also include the first communication device adapting to the residual noise during time slots of one or more downstream symbol positions where the one or more other ports in the vectored group are switched off.

In one embodiment, in performing estimation of the residual noise, the method may include the first communication device generating an N by N matrix for each carrier in the transmitting port, wherein N indicates a number of ports in the vectored group.

In one embodiment, in adapting to the residual noise, the method may include the first communication device signaling to the second communication device changes in downstream bit-loading with a set of predefined rules.

In one embodiment, the method may further include the first communication device reducing the residual noise when the one or more other ports in the vectored group are switched off.

In one embodiment, the method may further include the first communication device determining one or more bit-loading tables that are different from each other and transmitting a time-division duplexing (TDD) frame to the second communication device.

In one embodiment, the TDD frame may include a plurality of downstream symbols. One of the downstream symbols may include a robust management channel (RMC) symbol. A content of the RMC symbol may be related to residual crosstalk management.

In one embodiment, the RMC symbol may indicate one of the one or more bit-loading tables for use by the transmitting port for each of the plurality of downstream symbols.

In one embodiment, the method may further include the first communication device dynamically switching on or off one or more ports in the vectored group.

This summary is provided to introduce concepts relating to dynamic rate adaptation in a vectored G.fast system. Some embodiments of the mechanism, techniques, methods, systems and devices are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

DETAILED DESCRIPTION OF PREFERRED EMBODIMENTS

Overview

In view of the aforementioned problems with existing techniques and approaches, techniques in accordance with the present disclosure enables a FTU-O device to predict the noise change precisely even if the switching is done dynamically. According to the present disclosure, a media access plan (MAP)-like symbol is included at the beginning of each time-division duplexing (TDD) frame indicating the SNR in each symbol the receiver is expected to experience or, alternatively, the bit-loading table to use due to the dynamic switching, help eliminate the impact of residual crosstalk completely.

In order to be able to switch ports on and off dynamically (with a symbol-level granularity) while optimizing the throughput, the transmitter needs to signal to the receiver the SNR changes of each downstream symbol in a TDD frame. This implies that a per-TDD frame robust management channel (RMC) symbol is needed. According to the present disclosure, one approach is to generate a set of bit-loading tables that are negotiated a-priori. With the available information such as queue depth for each port and power budget, the FTU-O device may decide the active symbols for each port, may predict the SNR changes caused by muting ports, and may indicate the bit-loading table in the RMC symbol for the current frame.

Figures 1, 2:
FIG. 1 is a diagram of a TDD frame with a RMC symbol in accordance with an embodiment of the present disclosure.
FIG. 2 is a diagram of example content of a RMC symbol related to residual crosstalk management in accordance with an embodiment of the present disclosure.

FIG. 1 illustrates an example TDD frame in accordance with an embodiment of the present disclosure. As shown in FIG. 1, the TDD frame includes a number of downstream symbols D1-D10 and a number of upstream symbols U1-U10, with a RMC symbol at the D1 position. In one embodiment, the position of the RMC symbol is at the first symbol position in the downstream transmission as shown in FIG. 1. In various other embodiments, the position of the RMC symbol may be delayed or shifted to a different symbol position, e.g., another downstream symbol position.

FIG. 2 illustrates example content of a RMC symbol related to residual crosstalk management in accordance with an embodiment of the present disclosure. Depending on the number and position of the switched-off ports, the RMC symbol indicates, for each downstream symbol, the bit-loading table to be used for the receiver. The bit-loading tables may be exchanged during training time or during showtime by embedded operations channel (EOC). Showtime refers to an operation state in which frames are transmitted. In the example shown in FIG. 2 in which ports 1-3 of a vectored group of ten ports are switched off, the RMC symbol indicates bit-loading table 3 is to be used for downstream symbols 4 and 5, bit-loading table 5 is to be used for downstream symbols 6 and 7, bit-loading table 6 is to be used for downstream symbol 8, and bit-loading table 7 is to be used for downstream symbols 9 and 10.

Example Generation of Residual Noise Matrix

For convenience of description hereinafter, the term "CME" refers to a crosstalk management entity at the FTU-O side in the reference model that is responsible for the residual crosstalk energy calculation and management. CME may be a part of a power control entity (PCE) or a part of a vectoring control entity (VCE).

For each port of N ports the CME calculates an N×N residual noise matrix A for each tone. In matrix A the entry $A_{i,j}$ represents the amount of crosstalk port i would introduce to port j if port i is muted, or switched off. Mathematically the residual noise matrix A can be written in a close form. For systems that adopt some crosstalk elimination techniques, each entry in the residual noise matrix represents the noise difference of the compensated value to the perfect cancellation. Examples of residual noise matrix calculations are disclosed in later sections.

Example Bit-Loading Compensation Based on Residual Noise Matrix

Based on the residual noise matrix, it is possible for the CME to further calculate the bit-loading table for all combinations of muted ports. For example, if port 2 and port 3 are switched off, the amount of noise injected to port 1 equals to $A_{1,2}+A_{1,3}$. To fully optimize the throughput, a total of $N\times 2^N$ bit-loading tables are required. As the number of bit-loading tables tends to be large and hence not practical, further reduction may be preferred and performed as described below.

Example Reduction of Residual Noise Matrix

A straight-forward reduction method based on the worst case residual noise matrix is shown below.

With the residual noise matrix A, a maximum residual noise vector m is defined with the following three steps:

1. Form an n-dimensional vector $\tilde{b}=[\tilde{b}_1 \ldots \tilde{b}_n]^T$ where $$\tilde{b}_i = \max_{j \neq i} A_{ij},$$

j=1, ..., n.

2. Sort $\tilde{b}$ in descending order to obtain $b=[b_1 \ldots b_n]^T$, i.e., $b_1 \geq b_2 \geq \ldots \geq b_n$.
3. Form an n-dimensional vector $m=[m_1 \ldots m_n]^T$ such that $m_i = \Sigma_{j=1}^{i} b_j$ Vector m is formed such that the row index is the number of port to be switched off. Each entry represents the worst case noise introduced to all other lines when a number of indexed ports are switched off. Based on vector m, no more than (N−1) bit-loading tables is needed to cover all possibilities. In showtime the CME checks the number of ports that would be switched off in every downstream symbol position and dials in the index of bit-loading table for the corresponding symbol by looking up in vector m.

Example Simplification of Bit-Loading Tables

In order to further reduce the amount of memory required for storing bit-loading tables, a number of techniques are proposed herein.

A first technique is tone-grouping. The grouping may be across the full transmission spectrum or may start from a specific frequency since the residual crosstalk problem is negligible in the low frequency.

A second technique is to derive new bit-loading tables based on a known one (e.g., the perfect bit-loading table). For example, bit-loading table 1 may be derived from bit-loading table 0 (e.g., the default table) with one bit drop on each tone. Bit-loading table 2 may be derived from bit-loading table 1 with one bit drop from tone 2000 to tone 3000 and two bits drop from tone 3001 and above. This technique may be combined with the tone-grouping technique and, advantageously, the impact on the memory size for multiple bit-loading tables can be minimized.

In some applications, each port may have enough data rate even when the worst case of residual crosstalk noise is used. In such case, a single bit-loading table may be used for all symbols.

Example Implementations

Figure 3:
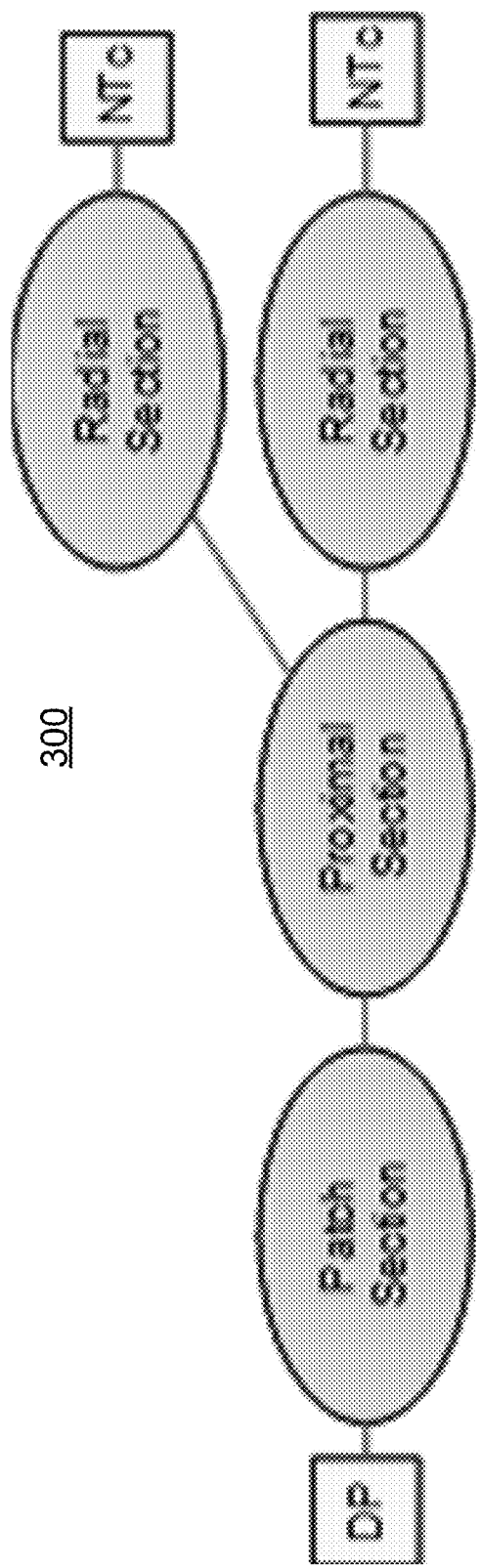
FIG. 3 is a diagram an overview of an example final drop in accordance with an embodiment of the present disclosure.
Figure 4:
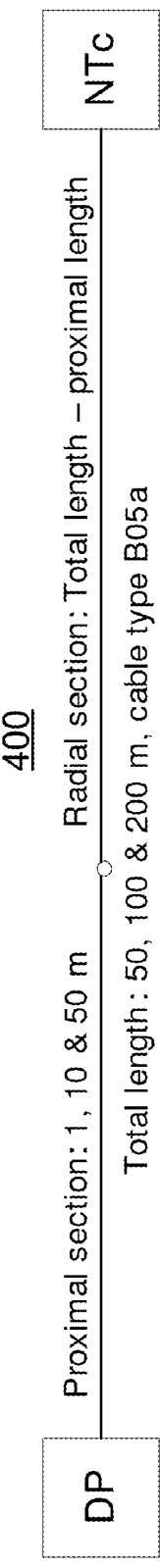
FIG. 4 is a diagram of an example final drop loop in accordance with an embodiment of the present disclosure.

Several examples based on the techniques described above are presented herein. Here, an N-port vectored group based on D5 wiring topology is assumed. To match a telecommunications service provider's cable measurement, the total loop length is fixed to 100 meters with a variable length in the proximal region. FIG. 3 illustrates an overview of an example final drop loop 300 in accordance with an embodiment of the present disclosure. FIG. 4 illustrates an example final drop loop 400 in accordance with another embodiment of the present disclosure.

Single Bit-Loading Table

Figure 5:
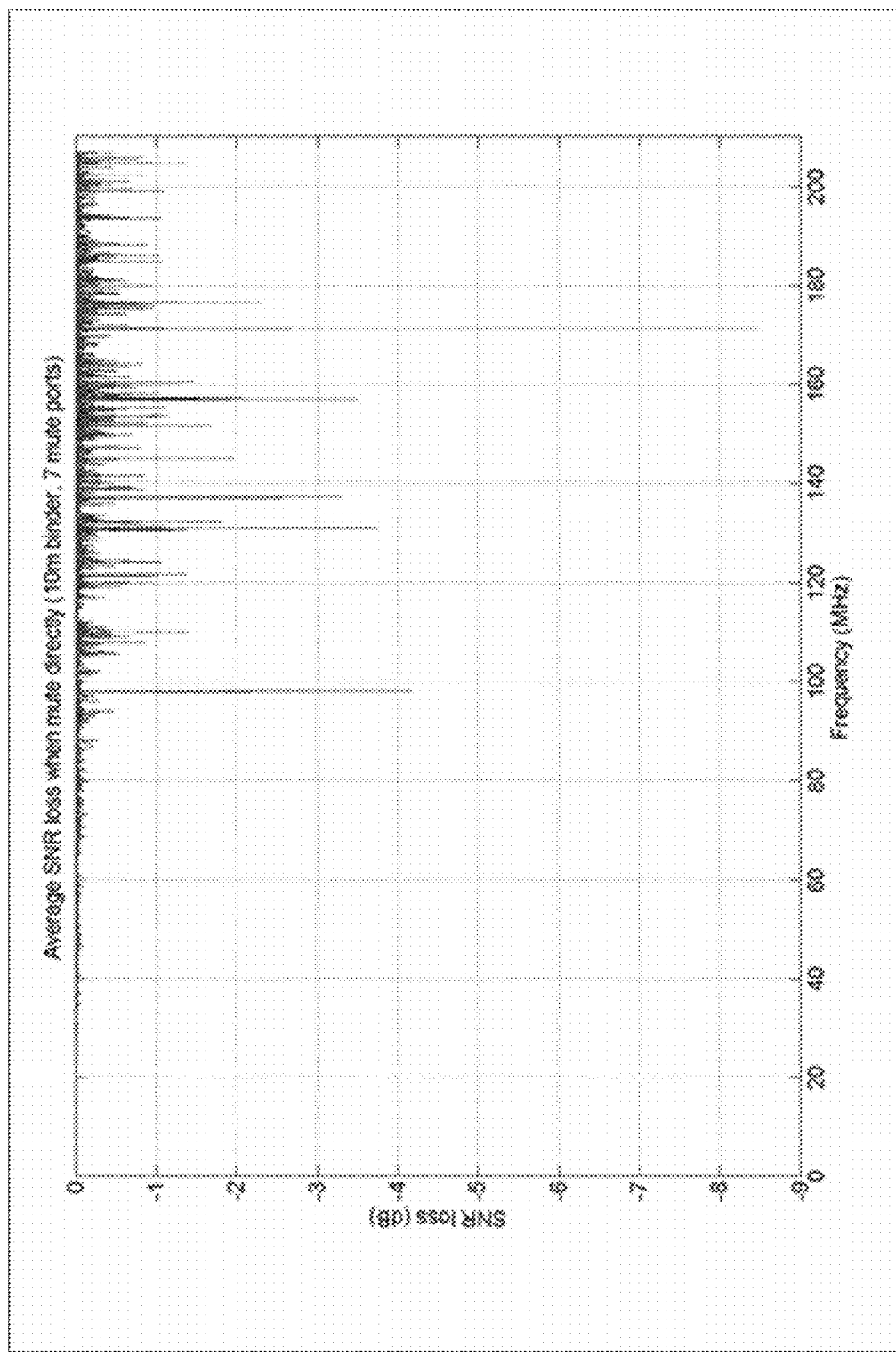
FIG. 5 is a diagram of average SNR loss when mute directly in a short proximal region.

FIG. 5 is a diagram of average SNR loss when muting directly in a short (e.g., 10 meters) proximal region. If the proximal region is short, the crosstalk noise is not severe as shown in FIG. 5. In this case a single bit-loading table is sufficient. In simulations sometimes isolated noise spike appear such as the one between 90 MHz and 100 MHz in FIG. 5. Preferably these tones are turned off or, load fewer bits, otherwise they may break trellis code and cause a burst of error.

Multiple Bit-Loading Tables with Direct Muting

Figure 6:
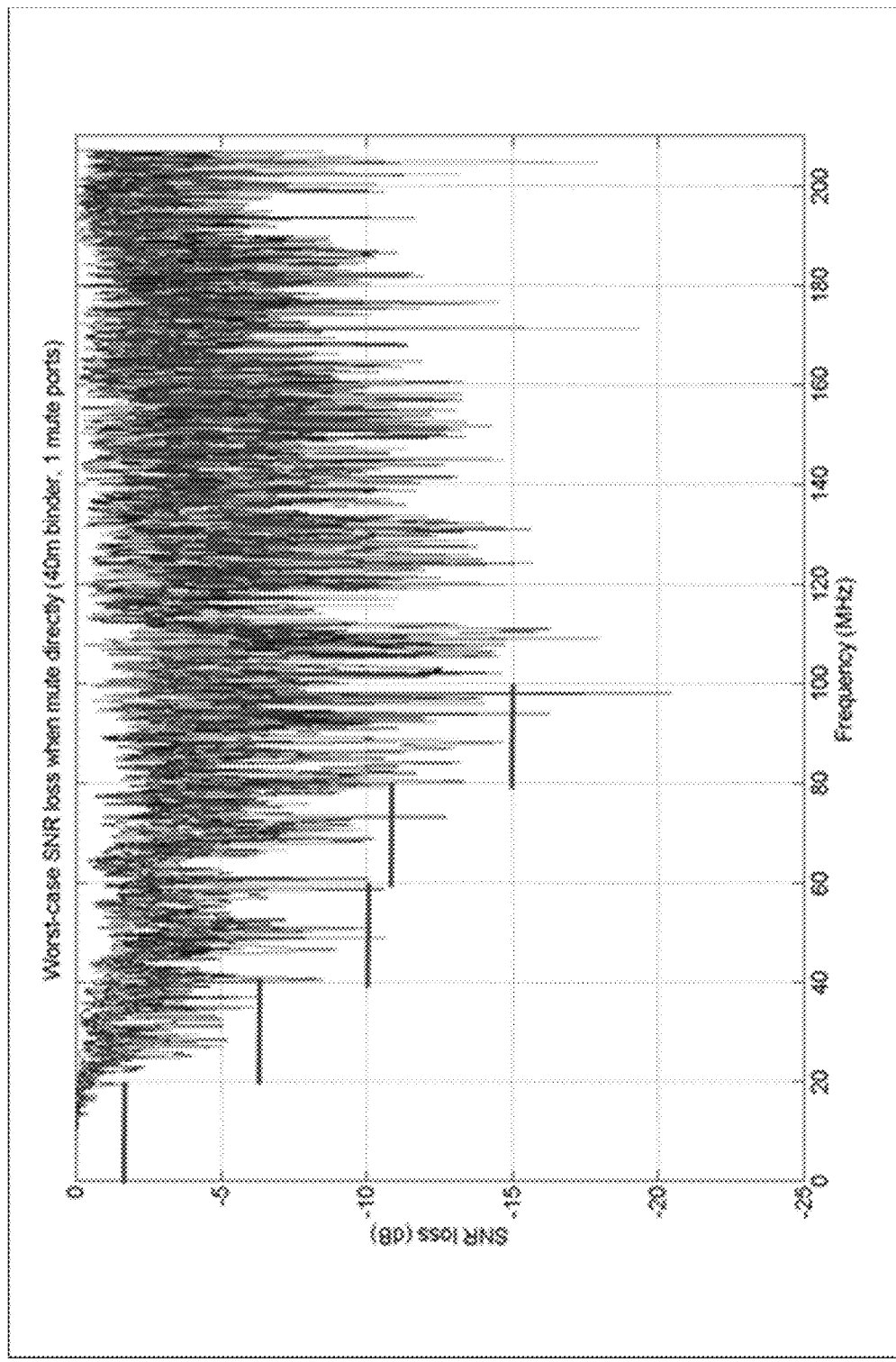
FIG. 6 is a diagram showing the worst case SNR loss when one port is switched off.
Figure 7:
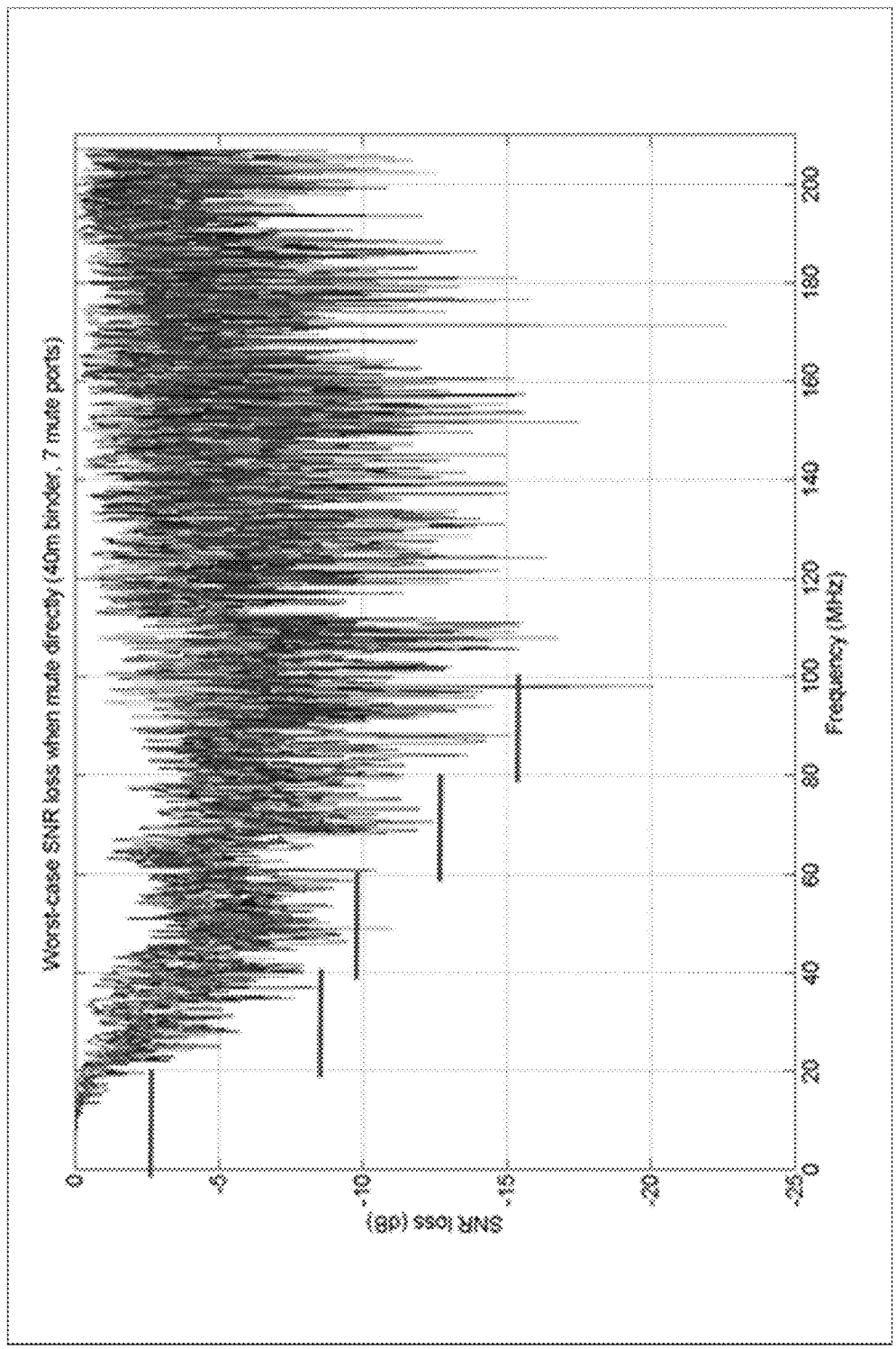
FIG. 7 is a diagram showing the worst case SNR loss when seven ports are turned off.
Figure 8:
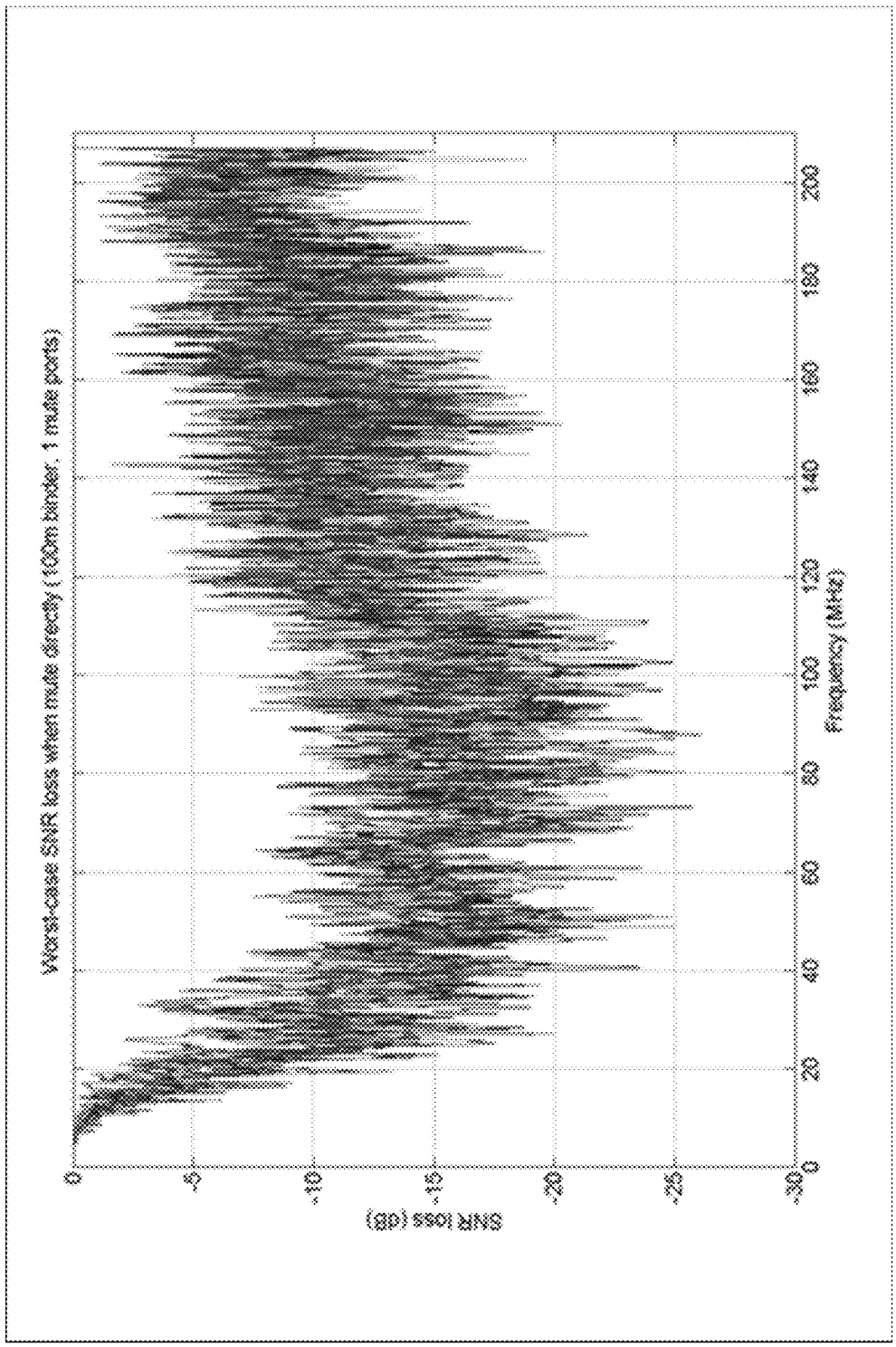
FIG. 8 is a diagram showing significant SNR loss.
Figure 9:
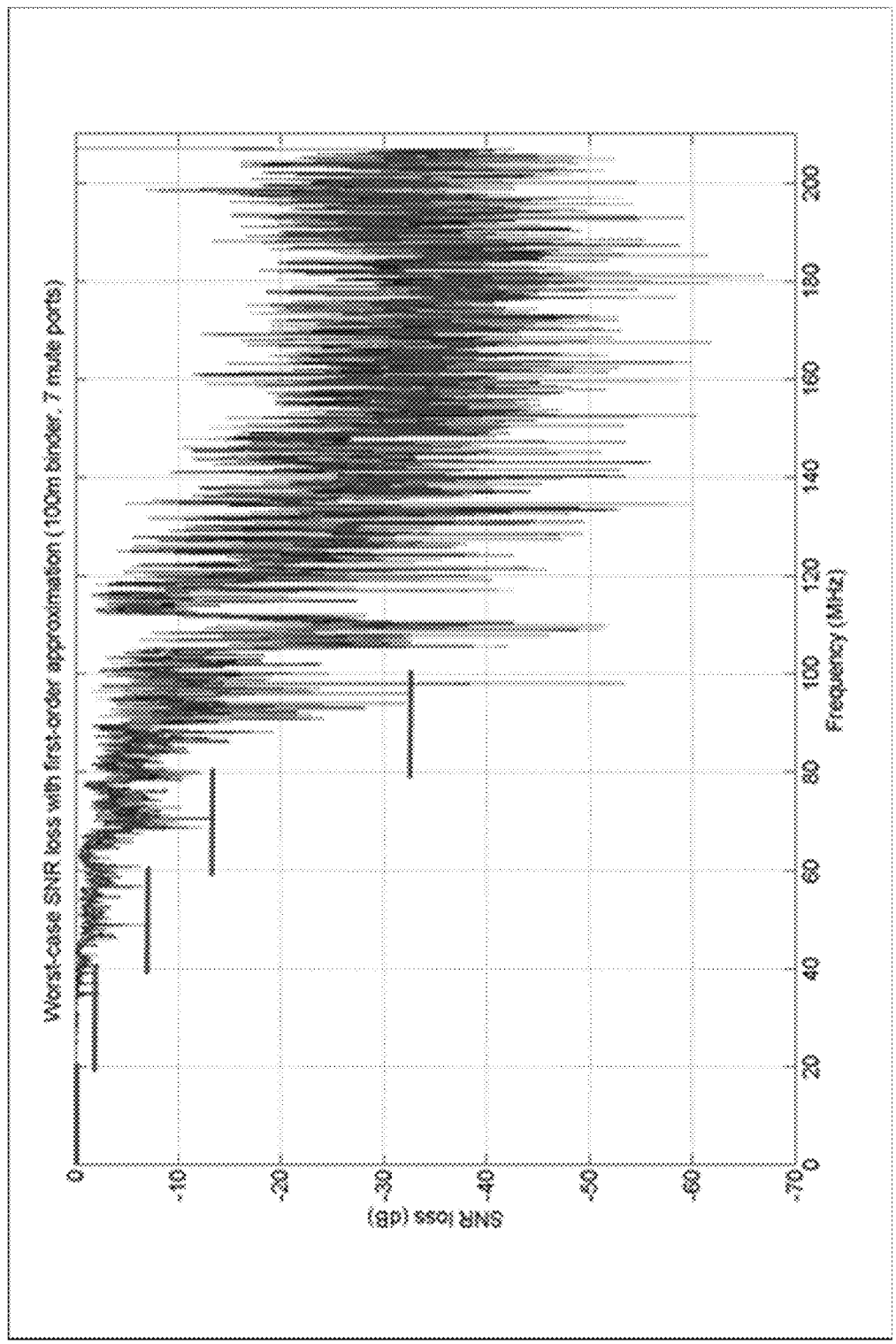
FIG. 9 is a diagram showing significant SNR loss when seven ports are turned off with first-order compensation.

When the proximal region becomes longer and longer, the amount of residual crosstalk varies with the number of ports that is switched off. FIG. 6 shows the worst-case SNR loss when one port is switched off and FIG. 7 shows the worst-case SNR loss when seven ports are switched off. Assuming tone-grouping is used, the CME derives bit-loading tables based on the maximum SNR loss as highlighted in FIG. 8 and FIG. 9.

Multiple Bit-Loading Tables with Compensation Techniques

When the loop length in the proximal region is long the increase in residual crosstalk with direct muting is so severe such that the benefit of using multiple bit-loading tables are not apparent, as shown in FIG. 6.

In this case it is assumed that a first order compensation is used and it can be seen that with a proximal region of 100 meters there is significant residual crosstalk energy in the high-frequency spectrum. Without swapping the bit-loading tables, the system can only run under full-power mode or under reduced bit rate mode.

Example Residual Noise Analysis

The following analysis assumes an n-port vectored G.fast system. Specifically, given that HP=D, where $$H = \begin{bmatrix} H_{aa} & H_{ad} \\ H_{da} & H_{dd} \end{bmatrix}, P = \begin{bmatrix} P_{aa} & P_{ad} \\ P_{da} & P_{dd} \end{bmatrix}, \text{ and } D = \begin{bmatrix} D_a & 0 \\ 0 & D_d \end{bmatrix}$$

with H denoting the channel matrix, P denoting the precoding matrix, and D denoting a diagonal matrix representing the resulting direct channels, respectively, in which a and d denote the sets of active and muted ports, respectively. It is known that $H_{aa}(P_{aa} - P_{ad}P_{dd}^{-1}P_{da})D_a$ and hence one proper precoding matrix $P'_{aa}$ for the active ports is given by equation (1) below:

$$P'_{aa} = P_{aa} - P_{ad}P_{dd}^{-1}P_{da}. \quad (1)$$

As the computation of $P_{dd}^{-1}$ is too complex to be affordable when the number of muted ports is large and per-symbol on/off switching is desired, some approximation techniques are proposed, which will introduce some residual noise to the active ports at the FTU-R side. Therefore, this impact on the system is quantified as described below.

Residual Noise when Mute Directly

If the trained precoder is used without any change, the output of the precoder will be as follows:

$$y = \begin{bmatrix} y_a \\ y_d \end{bmatrix} \triangleq \begin{bmatrix} P_{aa} & P_{ad} \\ P_{da} & P_{dd} \end{bmatrix} \begin{bmatrix} x_a \\ 0 \end{bmatrix} = \begin{bmatrix} P_{aa}x_a \\ P_{da}x_a \end{bmatrix}.$$

Since in this case the inactive ports are muted directly, the system simply transmits $y_a$ through the active ports of the FTU-O device, and the received signal at the FTU-R is as follows:

$$r = \begin{bmatrix} r_a \\ r_d \end{bmatrix} \triangleq \begin{bmatrix} H_{aa} & H_{ad} \\ H_{da} & H_{dd} \end{bmatrix} \begin{bmatrix} y_a \\ 0 \end{bmatrix} + \begin{bmatrix} n_a \\ n_d \end{bmatrix} = \begin{bmatrix} H_{aa}P_{aa}x_a + n_a \\ H_{da}P_{aa}x_a + n_d \end{bmatrix},$$

where $n_a$ and $n_d$ are the additive noise at the receiver of active and muted ports, respectively. Therefore, the error signal after frequency domain equalizer (FEQ) at the active FTU-R can be expressed as follows:

$$e_a \triangleq D_a^{-1} r_a - x_a$$
$$= (D_a^{-1} H_{aa} P_{aa} - I_a) x_a + D_a^{-1} n_a$$
$$= D_a^{-1} H_{aa} P_{ad} P_{dd}^{-1} P_{da} x_a + D_a^{-1} n_a,$$

where the last equality follows from equation (1). With the above equation for error signal, the variance vector of residual noise can be obtained as follows:

$$\operatorname{Var}_m(a) \triangleq E[\operatorname{diag}(e_a e_a^H)]$$
$$= \operatorname{diag}\!\big((D_a^{-1} H_{aa} P_{ad} P_{dd}^{-1} P_{da})(D_a^{-1} H_{aa} P_{ad} P_{dd}^{-1} P_{da})^H\big)\sigma_s^2 +$$
$$\operatorname{diag}(D_a^{-1} D_a^{-1H})\sigma_n^2,$$

where $\sigma_s^2$ and $\sigma_n^2$ are the variance of transmitted signal and additive noise, respectively.

Finally, the SNR of the received signal at the ith active FTU-R can be expressed as follows:

$$SNR_{r,i} = \frac{\sigma_s^2}{\operatorname{Var}_{m,i}(a)},$$

where $\operatorname{Var}_{m,i}(a)$ is the component of $\operatorname{Var}_m(a)$ corresponding to the error signal at the $i^{th}$ active FTU-R, and the SNR loss of the $i^{th}$ active FTU-R compared with the ideal case can be defined as follows:

$$SNRLoss_i = \frac{\sigma_n^2}{\operatorname{Var}_{m,i}(a)|(D_a)_i|^2},$$

where $(D_a)_i$ is the component of $D_a$ corresponding to the direct-channel gain of the $i^{th}$ active port. Note that the SNR loss in log scale is equal to the difference of the resulting SNR from the ideal SNR.

Residual Noise with Approximate Precoder Update

For the case that the precoder is changed with some technique, helpful insight may be gained by simple analysis similar to that in previous subsection. Specifically, it is assumed that the precoding matrix after some change/update is $Q_{aa}=P'_{aa}+E_{aa}$. Then the output signal to be transmitted from the active FTU-O ports is $y_a=Q_{aa}x_a=P'_{aa}x_a+E_{aa}x_a$, and the error signal after FEQ at the active FTU-R is as follows:

$$e_a \triangleq D_a^{-1} r_a - x_a$$
$$= (D_a^{-1} H_{aa} Q_{aa} - I_a) x_a + D_a^{-1} n_a$$
$$= D_a^{-1} H_{aa} E_{aa} x_a + D_a^{-1} n_a.$$

As such, the variance vector of residual noise, the SNR of the received signal at the $i^{th}$ active FTU-R, and the SNR loss of the $i^{th}$ active FTU-R may be obtained by similar calculations as described above.

Residual Noise Matrix

From the above discussion it can be seen that for any set a of active ports, the impact on SNR due to residual noise can be mathematically evaluated with closed-form formula by first obtaining the corresponding variance vector $\operatorname{Var}_m(a)$ of residual noise. In practical applications, satisfactory upper bounds may be calculated offline or during training phase, and a set of bit-loading tables may be derived based on these upper bounds. The system can thus apply suitable bit-loading tables according to the combination or the number of active ports. Some useful upper bounds in various levels of simplification are presented below.

Example Worst-Case Residual Noise Matrix

First, an n×n worst-case residual noise matrix $W=[W_{ik}]$ is constructed, where $$W_{ik} = \max_{a:\, i \in a, |a|=n-k} \operatorname{Var}_{m,i}(a).$$

It should be clear that $W_{ik}$ provides a tight upper bound on the variance of the residual noise introduced to port i when there are k ports muted. Therefore, bit-loading tables based on the worst-case residual noise matrix can achieve a throughput close to the worst-case system capacity.

Furthermore, for a fixed number k, $1 \le k \le n-1$, there are a total of $$\binom{n}{k} = \frac{(n-k)!}{k!}$$

possible combinations of k muted ports. Hence it is necessary to calculate $\Sigma_{k=1}^{n}\binom{n}{k}=2^n-1$ different $\operatorname{Var}_m(a)$ to obtain the worst-case residual noise matrix.

Example Statistical Residual Noise Matrix

For the case that there is knowledge about the on/off switching pattern (e.g., information on the random set a of active ports), the variance of average residual noise introduced to each port can be obtained. In such cases, the system can achieve a higher throughput with bit-loading tables based on a statistical residual noise matrix rather than the worst-case residual noise matrix.

Example Maximum Residual Noise Vector

As seen from above the worst-case residual noise matrix requires exhaustive calculation for all possible active subsets, which is time-consuming and may be impractical for systems with a large number of ports. Hence, a simplified approach that may be very useful in many circumstances is proposed herein.

For each port i, i=1, 2, . . . , n, $\operatorname{Var}_m(a)$ is first calculated for the active set $a=\{i\}$, say $\operatorname{Var}_m(i)=[\sigma_{i,1}^2, \ldots, \sigma_{i,i-1}^2, \sigma_{i,i+1}^2, \ldots, \sigma_{i,n}^2]$, which consists of the variance of the residual noise introduce to each other port when port i is muted. Then a residual noise matrix $A=[A_{ij}]$ can be formed with $$A_{ij} = \begin{cases} \sigma_{i,j}^2, & \text{if } i \ne j, \\ 0, & \text{if } i = j. \end{cases}$$

With the residual noise matrix A, a maximum residual noise vector m is further defined with the following three steps:

1. Form an n-dimensional vector $\tilde{b}=[\tilde{b}_1 \ldots \tilde{b}_n]^T$ where $$\tilde{b}_i = \max_{j \neq i} A_{ij},$$

j=1, ..., n.

2. Sort $\tilde{b}$ in descending order to obtain $b=[b_1 \ldots b_n]^T$, i.e., $b_1 \geq b_2 \geq \ldots \geq b_n$.

3. Calculate the maximum residual noise vector $m=[m_1 \ldots m_n]^T$, where $m_i = \sum_{j=1}^{i} b_j$.

Notably, the calculation of the maximum residual noise vector only requires n calculations of $Var_m(a)$, which is much simpler than that of the worst-case residual noise matrix. It is also noteworthy to point out that residual-noise-based bit-loading can be applied independently or combined with any precoder update techniques.

Numerical Results

Some numerical results are presented herein to demonstrate the usefulness of the derived analysis. The examples assume a 10-port vectored group based on D5 wiring topology as defined in the draft recommendation. To match a certain telecommunication service provider's cable measurement, the total loop length is fixed to 100 meters with a variable length in the proximal region. The cable is assumed to be homogeneous and thus the insertion loss and the far end crosstalk (FEXT) response of a 10-meter binder can be obtained from the measurement by taking the 10th roots of the interpolated ones. Then, channels corresponding to the final drops are generated with a proximal section of length L meters and a radial section of length 100−L meters, for L=10, 40, 100.

In the numerical results shown below, the worst-case SNR loss of direct-mute method and the SNR loss with precoders updated are compared using first-order approximation technique. Furthermore, the estimated worst-case channel capacity for 100 MHz bandplan are compared with various methods for received SNR evaluation mentioned above. The channel capacity is estimated using the following equations:

$$\text{Bitload on tone } k = \log_2\left(1 + \frac{SNR}{\text{gamma}}\right), \text{ where gamma} = 10.8(\text{dB})$$

Capacity = (sum over all used tones with bit − load ≥
    0.5 of the values min(bit − load, 12))

Figure 10:
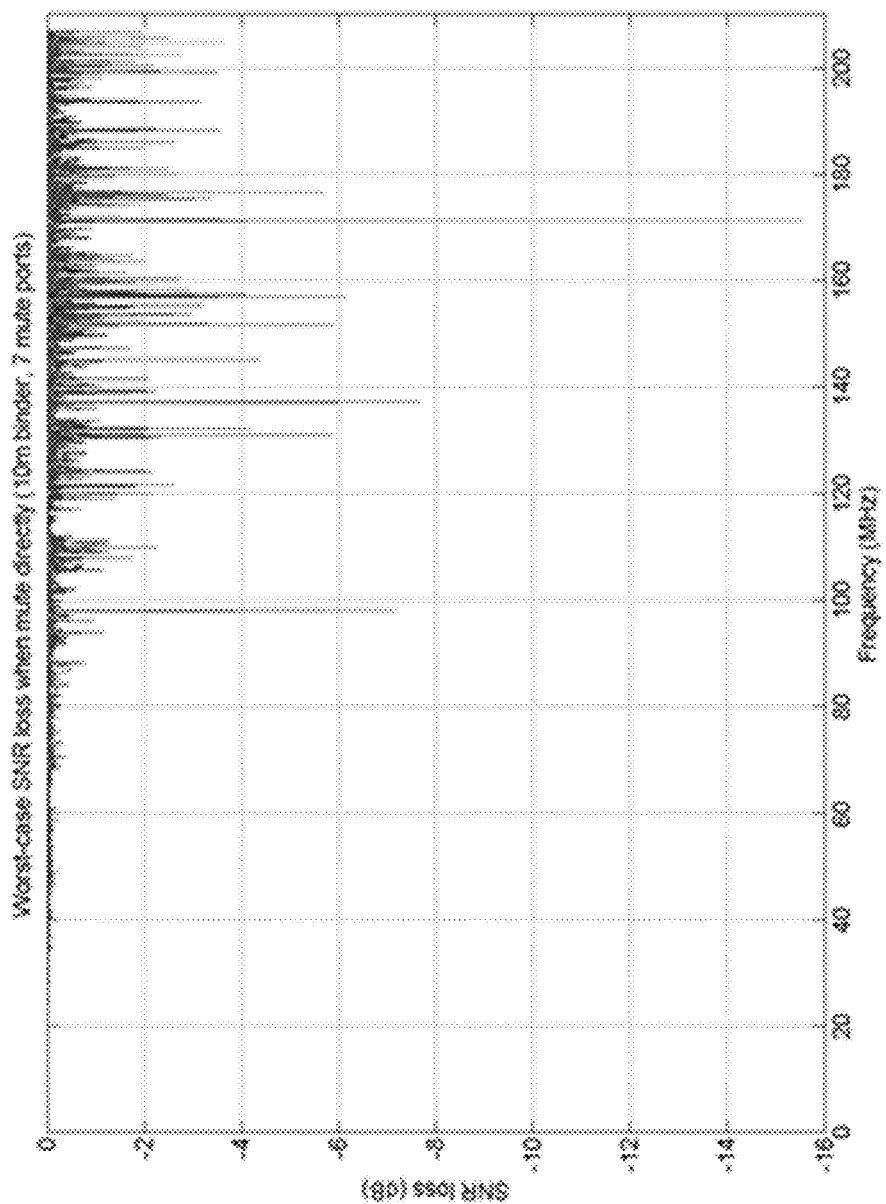
FIG. 10 is a diagram showing worst-case SNR loss with direct mute (seven muted ports over 10-meter binder).
Figure 11:
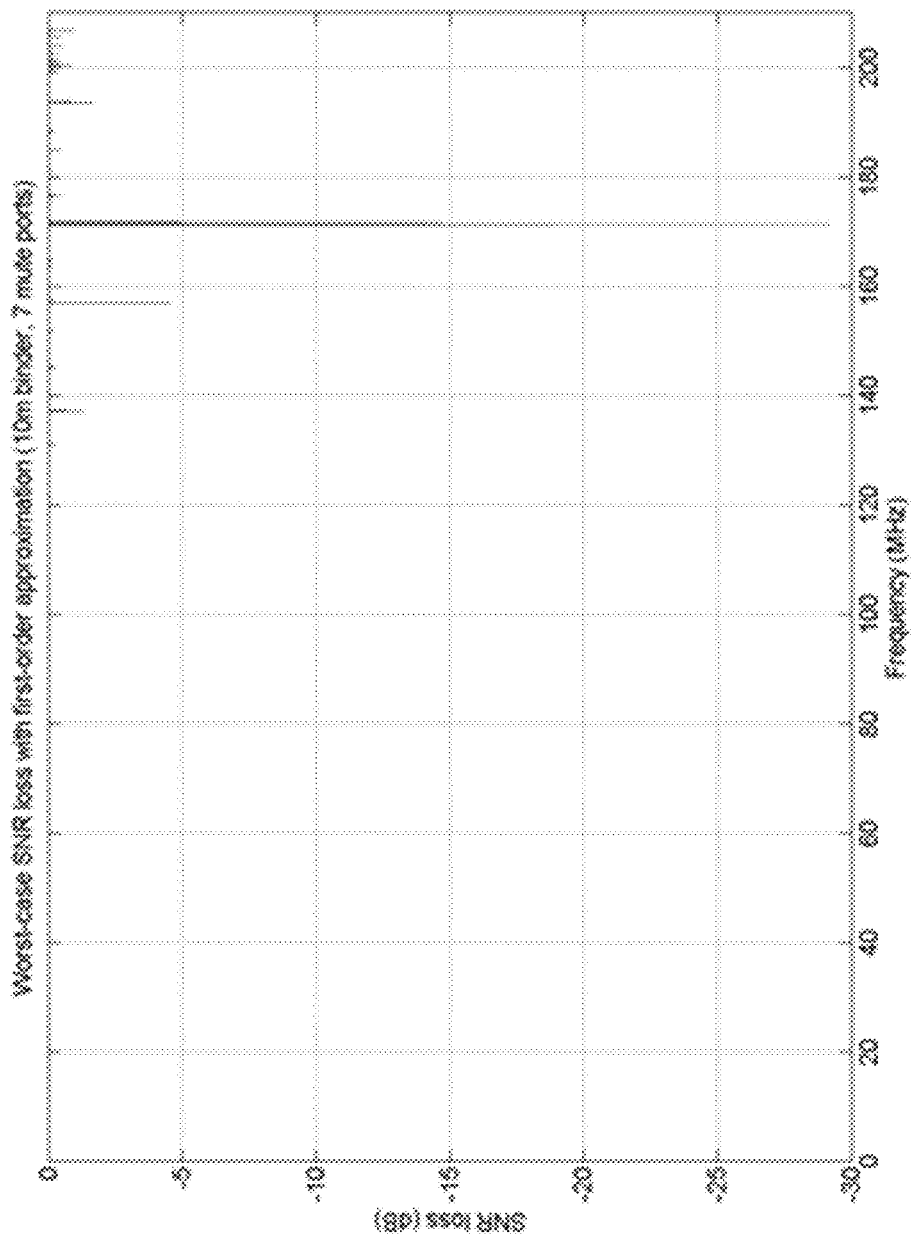
FIG. 11 is a diagram showing worst-case SNR loss with precoder update using first-order approximation (seven muted ports over 10-meter binder).
Figure 12:
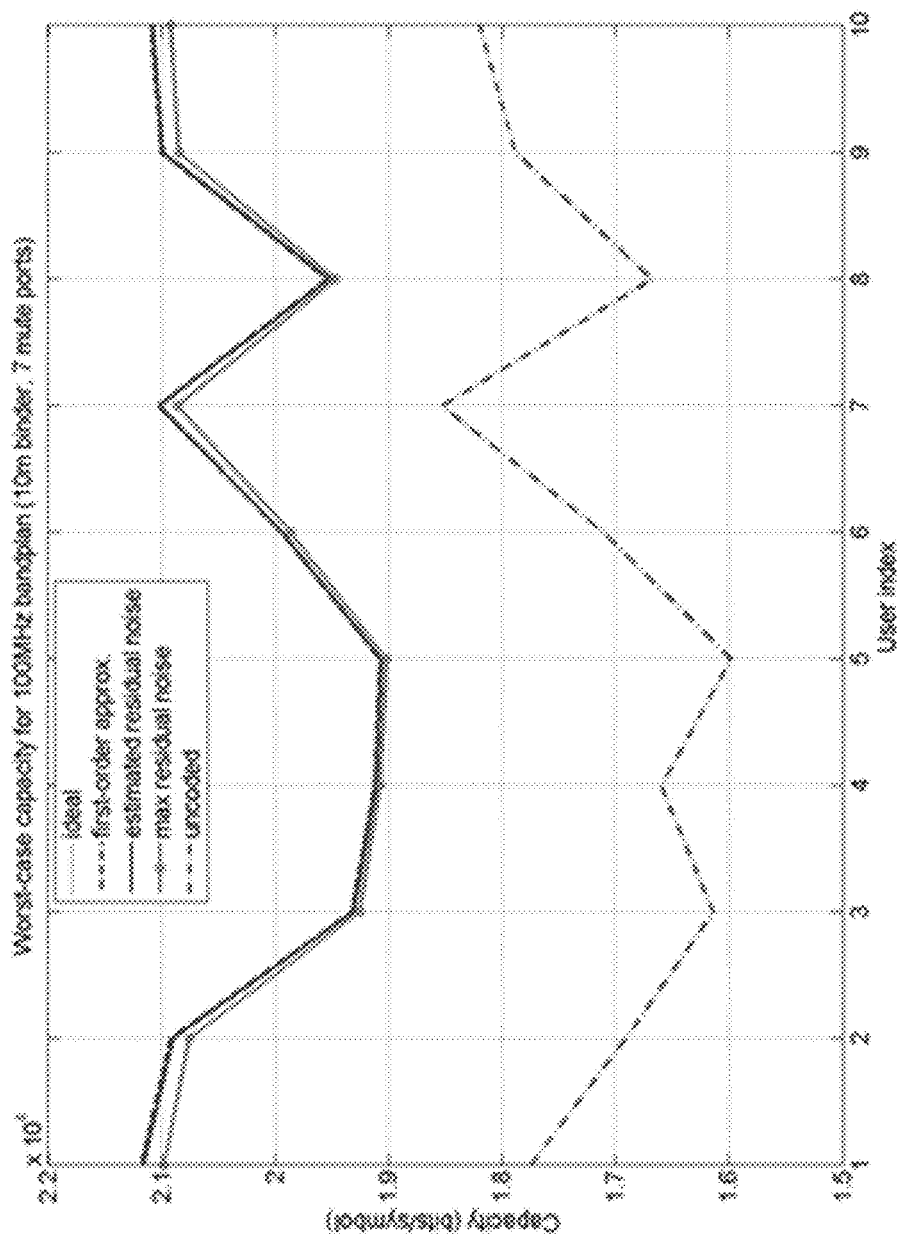
FIG. 12 is a diagram showing worst-case capacity with seven muted ports over 10-meter binder.

The results for L=10 are shown in FIGS. 10-12.

In FIG. 12, the precoding matrix in equation (1) is used to obtain the capacity for ideal case, and the precoding matrix is changed for the case of first-order approximation. In addition, the capacity when using first-order precoder update combined with bit-loading based on worst-case residual noise (WRN), as well as the capacity under direct-mute policy with different bit-loading based on various estimation of residual noise presented above, are shown. It can be seen that the worst-case capacities of all precoded cases are very close to those of the ideal case with a short binder and hence slight crosstalk.

Figure 13:
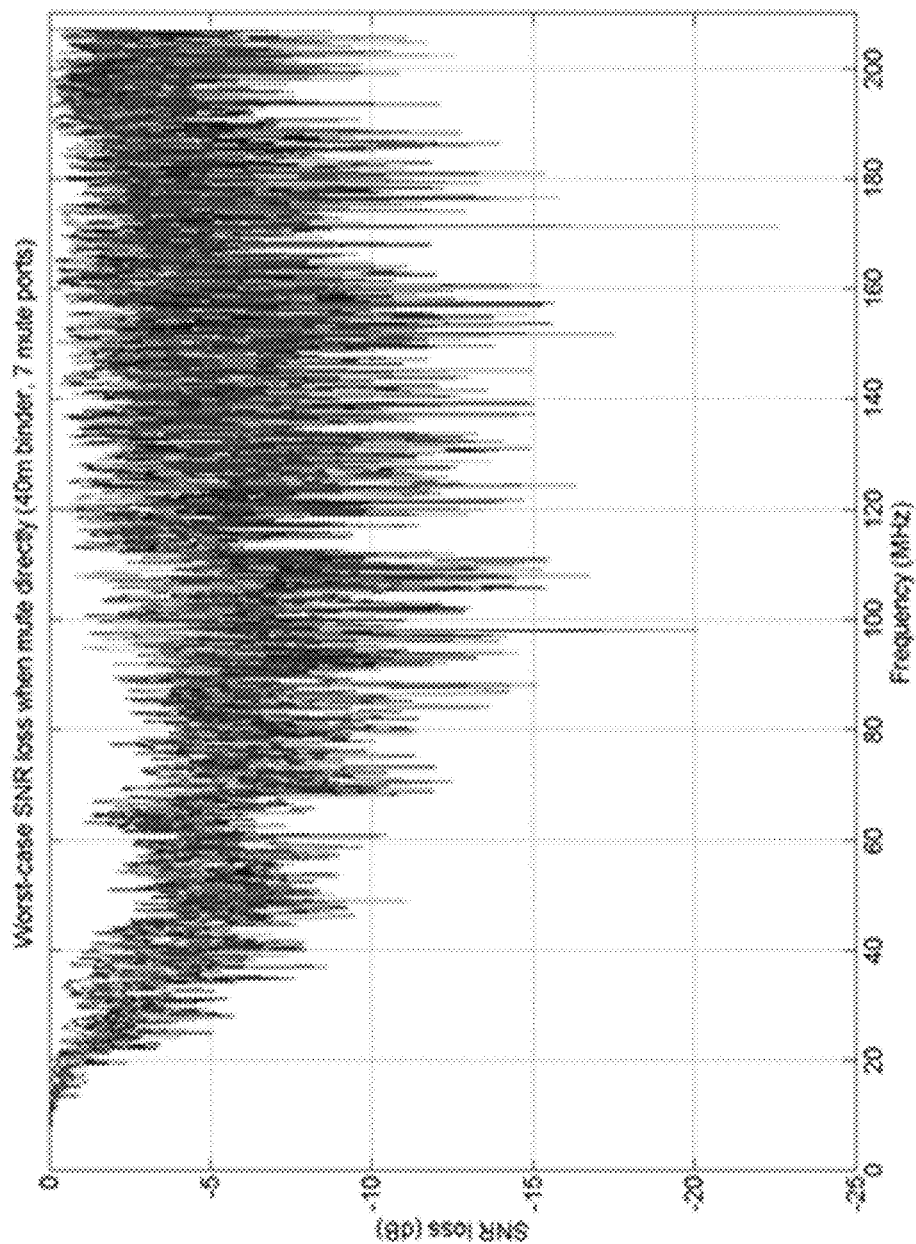
FIG. 13 is a diagram showing worst-case SNR loss with direct mute (seven muted ports over 40-meter binder).

In FIG. 13, significant SNR loss results from direct-mute in a 40-meter binder can be observed for tones above 20 MHz.

Figure 14:
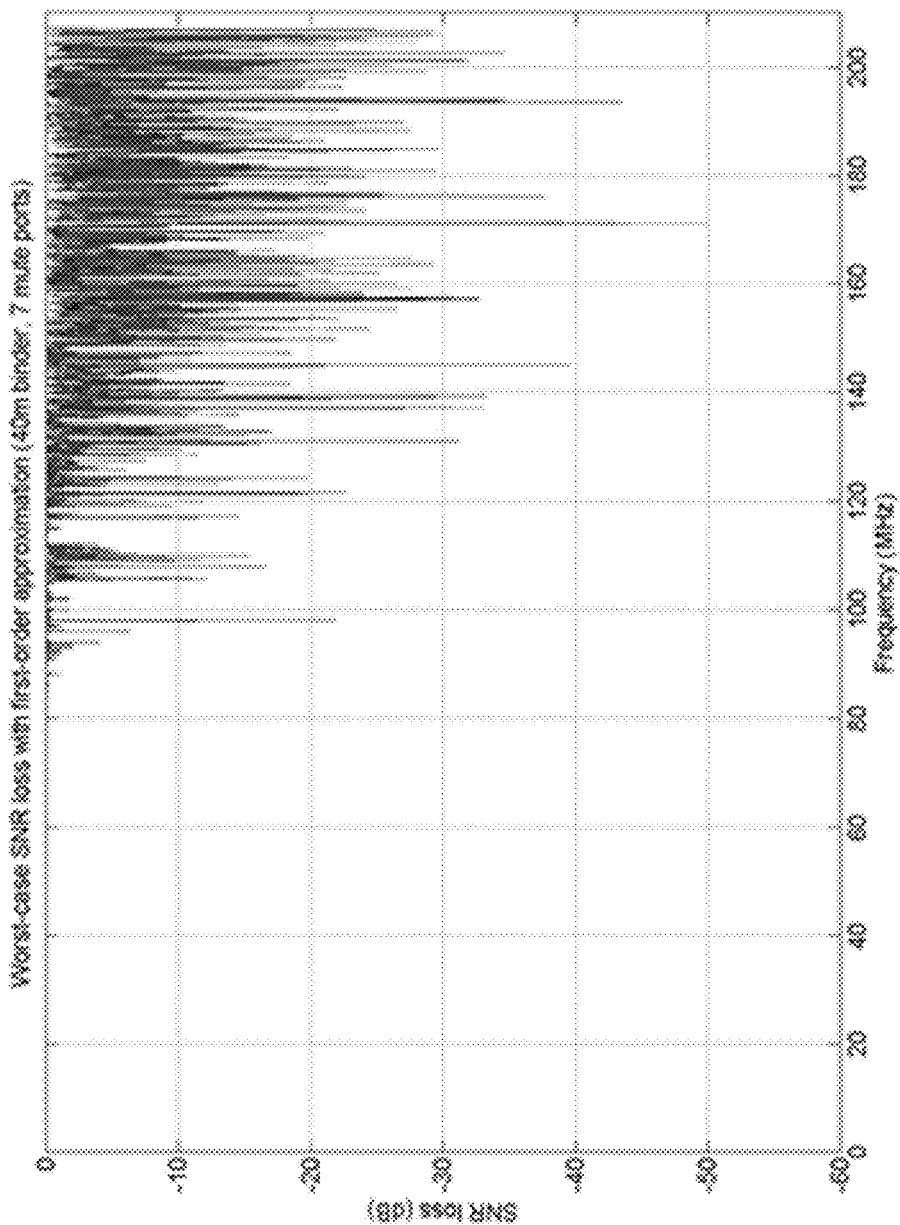
FIG. 14 is a diagram showing worst-case SNR loss with precoder update using first-order approximation (seven muted ports over 40-meter binder).

As shown in FIG. 14, even when the precoders are updated using first-order approximation, significant SNR loss can be observed for tones above 100 MHz.

Figure 15:
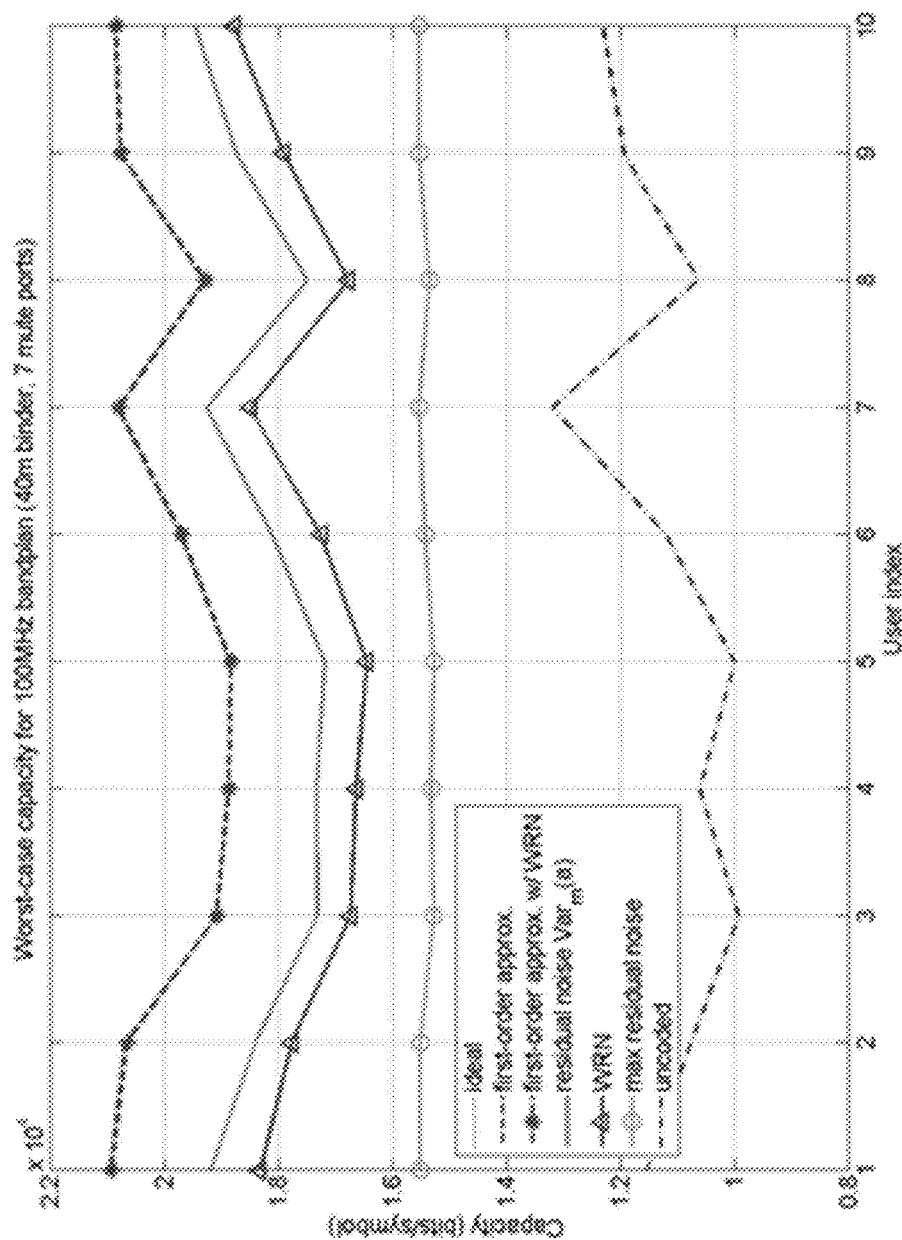
FIG. 15 is a diagram showing worst-case capacity with seven muted ports over 40-meter binder.

FIG. 15 shows worst-case capacity with seven muted ports over 40-meter binder.

Figure 16:
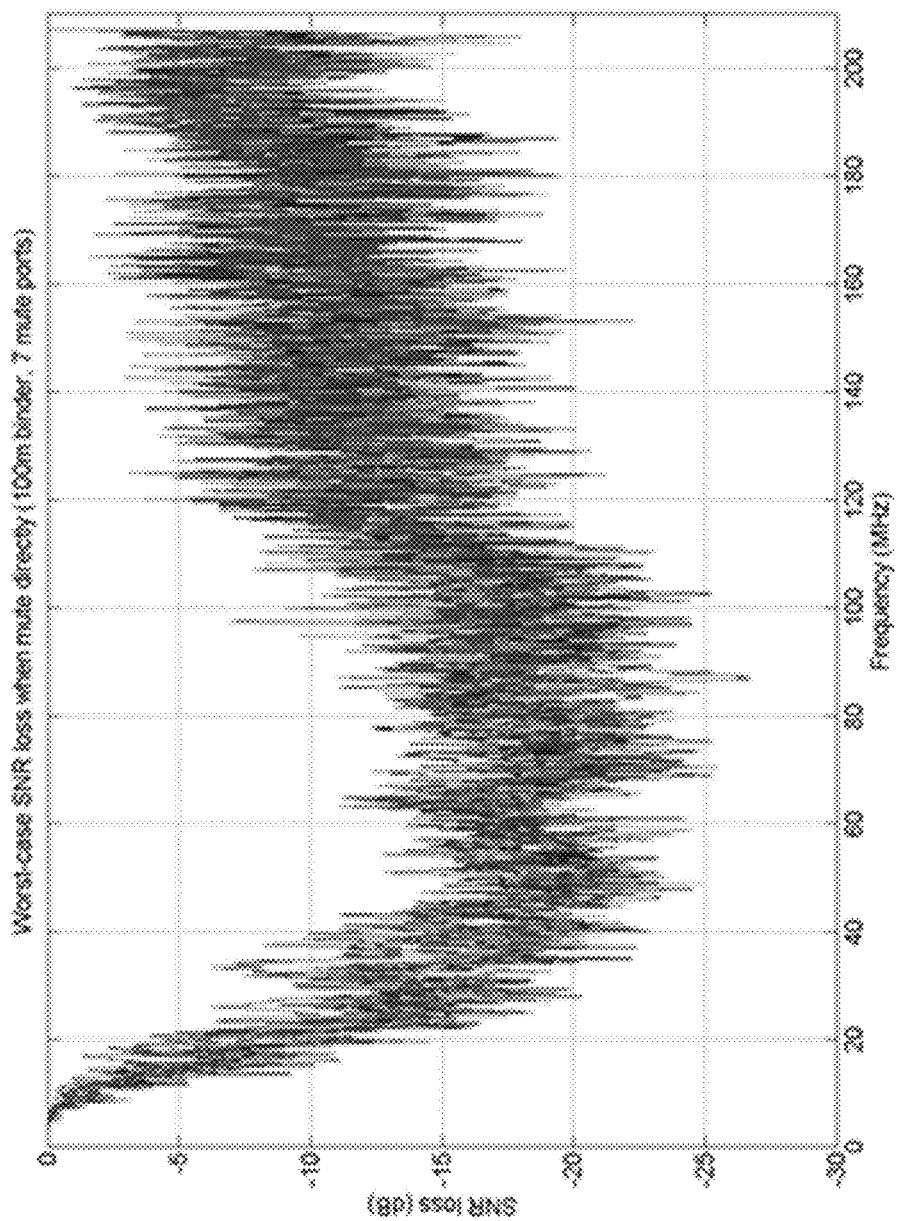
FIG. 16 is a diagram showing worst-case SNR loss with direct mute (seven muted ports over 100-meter binder).

FIG. 16 shows worst-case SNR loss with direct mute (seven muted ports over 100-meter binder).

Figure 17:
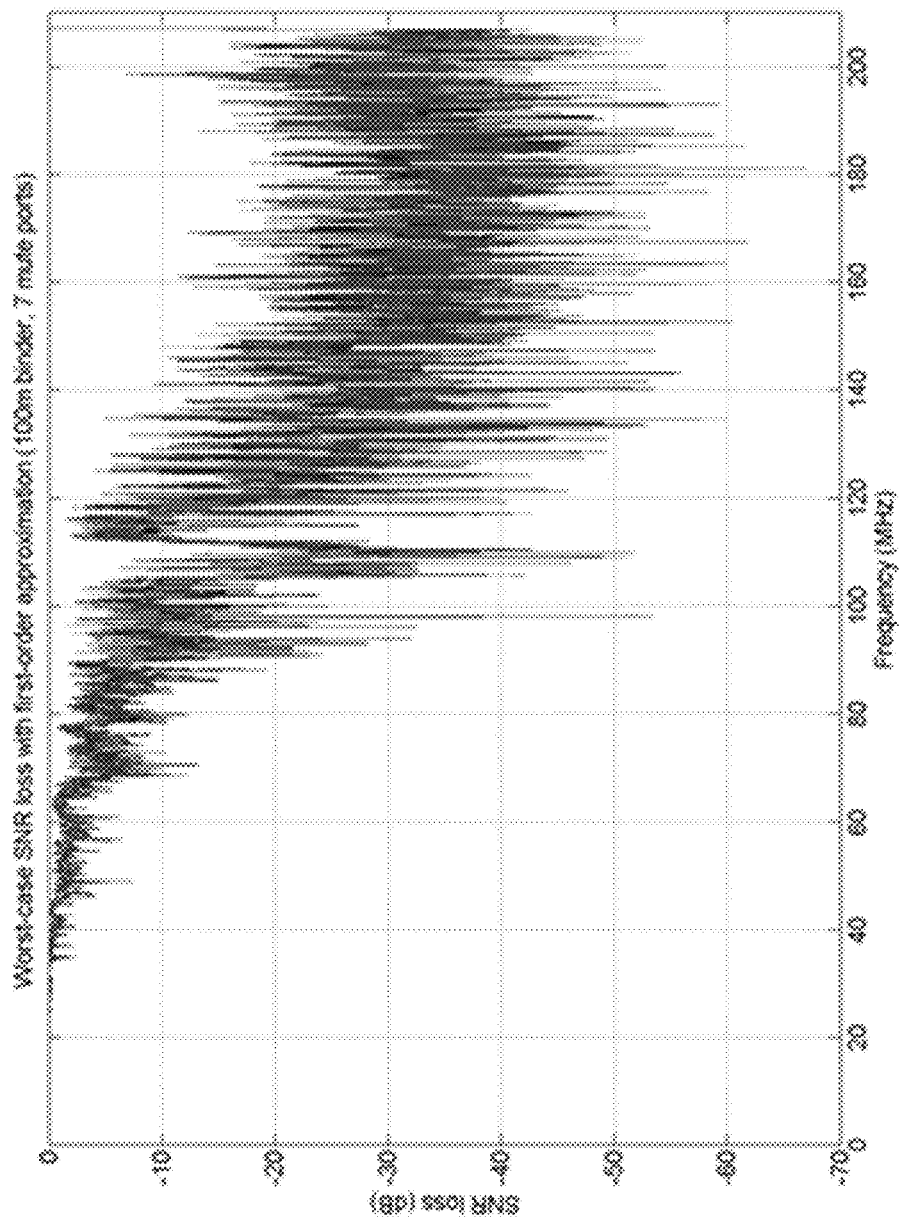
FIG. 17 is a diagram showing worst-case SNR loss with precoder update using first-order approximation (seven muted ports over 100-meter binder).
Figure 18:
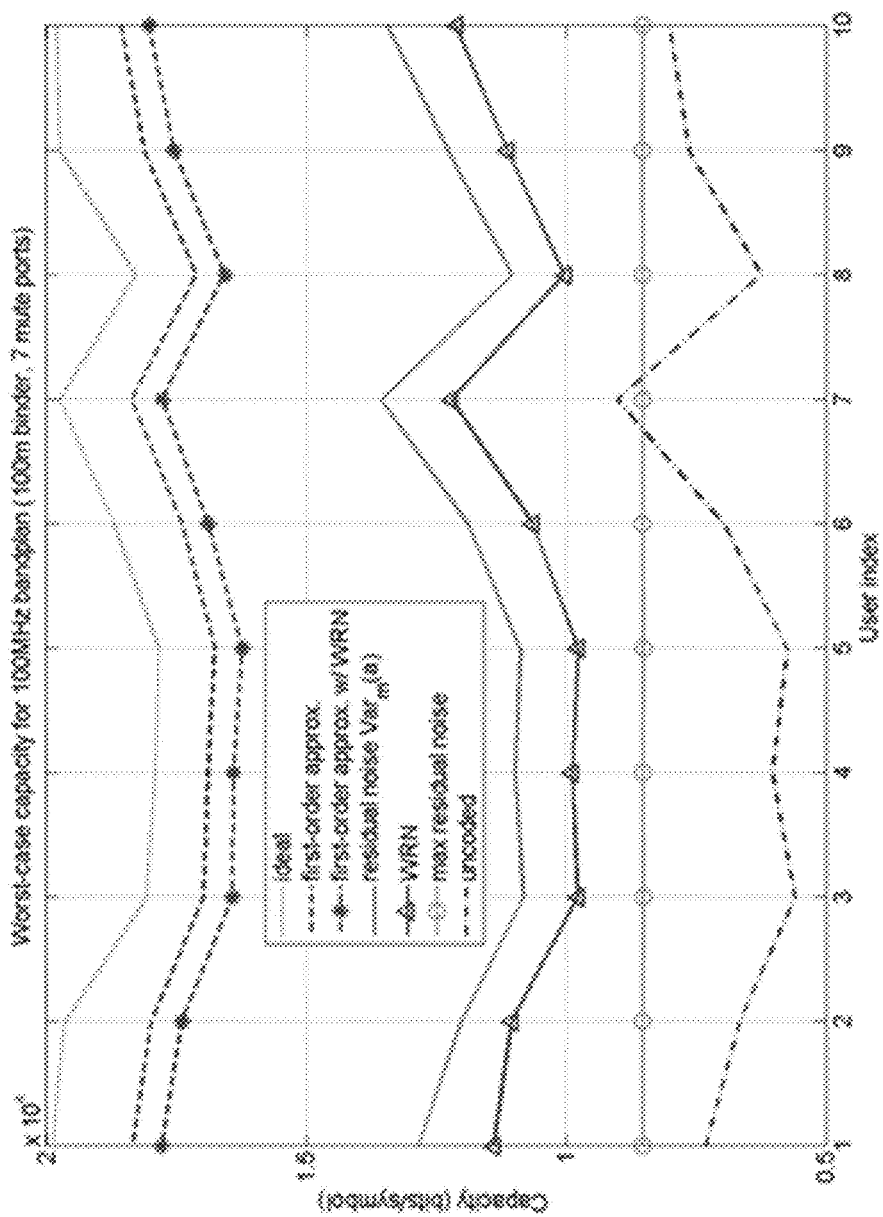
FIG. 18 is a diagram showing worst-case capacity with seven muted ports over 100-meter binder.

For a 100-meter binder, it can be seen from FIG. 18 there are obvious differences of capacity (about 10%) between the ideal case and the case of first-order approximated update. FIG. 17 shows that the first-order approximation degrades at high frequency. At frequency above 80 MHz the SNR loss can go beyond 10 dB. If the system is operated with the perfect bit-loading table (e.g., one derived from the SNR when all ports are active) and with an SNR margin of 6 dB, a lot of errors in this frequency region may be obtained. As mentioned above, the precoder update techniques and dynamic bit-loading technique may be combined based on the residual noise analysis to achieve better capacities.

Example Device

Figure 19:
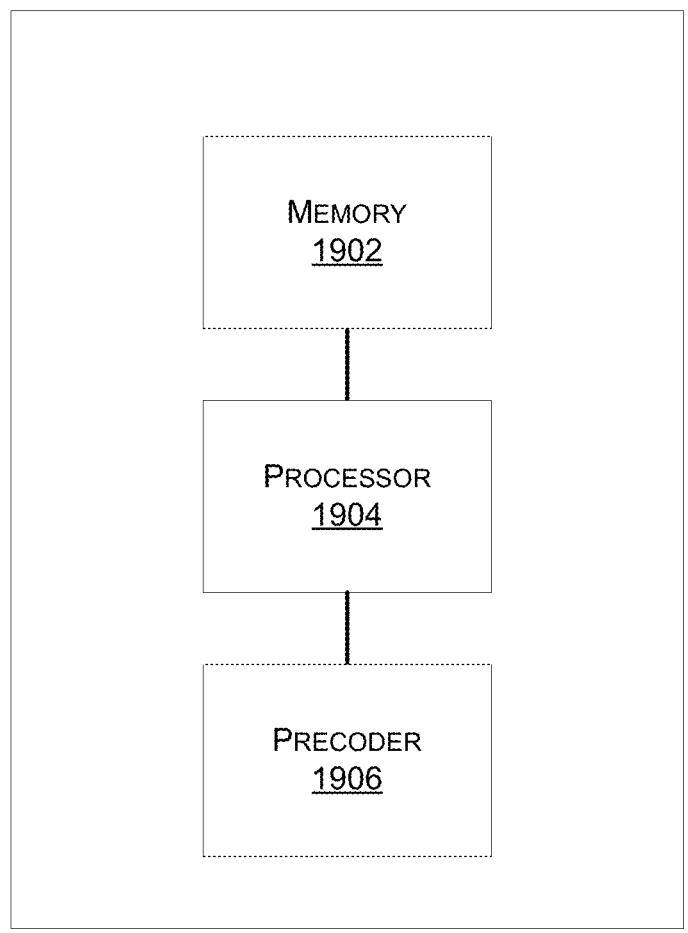
FIG. 19 is a block diagram of an example device in accordance with an embodiment of the present disclosure.

FIG. 19 illustrates a communication device 1900 in accordance with an embodiment of the present disclosure.

Communication device 1900 is configured to implement systems and methods in accordance with the present disclosure. Communication device 1900 includes at least a memory 1902 and a processor 1904. Communication device 1900 may be, for example, a communication processor or chipset implemented in a communication apparatus such as a transmitter, transceiver, gateway, router, switch or the like in a TDD OFDM communication system. For example, communication device 1900 may be a FTU-O device. In some embodiments, communication device 1900 includes more than one processor 1904 and/or more than one memory 1902. For simplicity, the description hereinafter refers to examples in which communication device 1900 includes one processor 1904 that performs the described operations.

In one example, the memory 1902 may be configured to store data, one or more sets of instructions, or both. The processor 1904 may be coupled to access the memory 1902, and may be configured to perform a number of operations described herein regarding residual noise estimation and adaptation for effective power management.

In one embodiment, processor 1904 may be configured to perform precoding as a precoder. Alternatively, communication device 1900 may include a precoder 1906 that is coupled to and controlled by processor 1904.

Example Process

Figure 20:
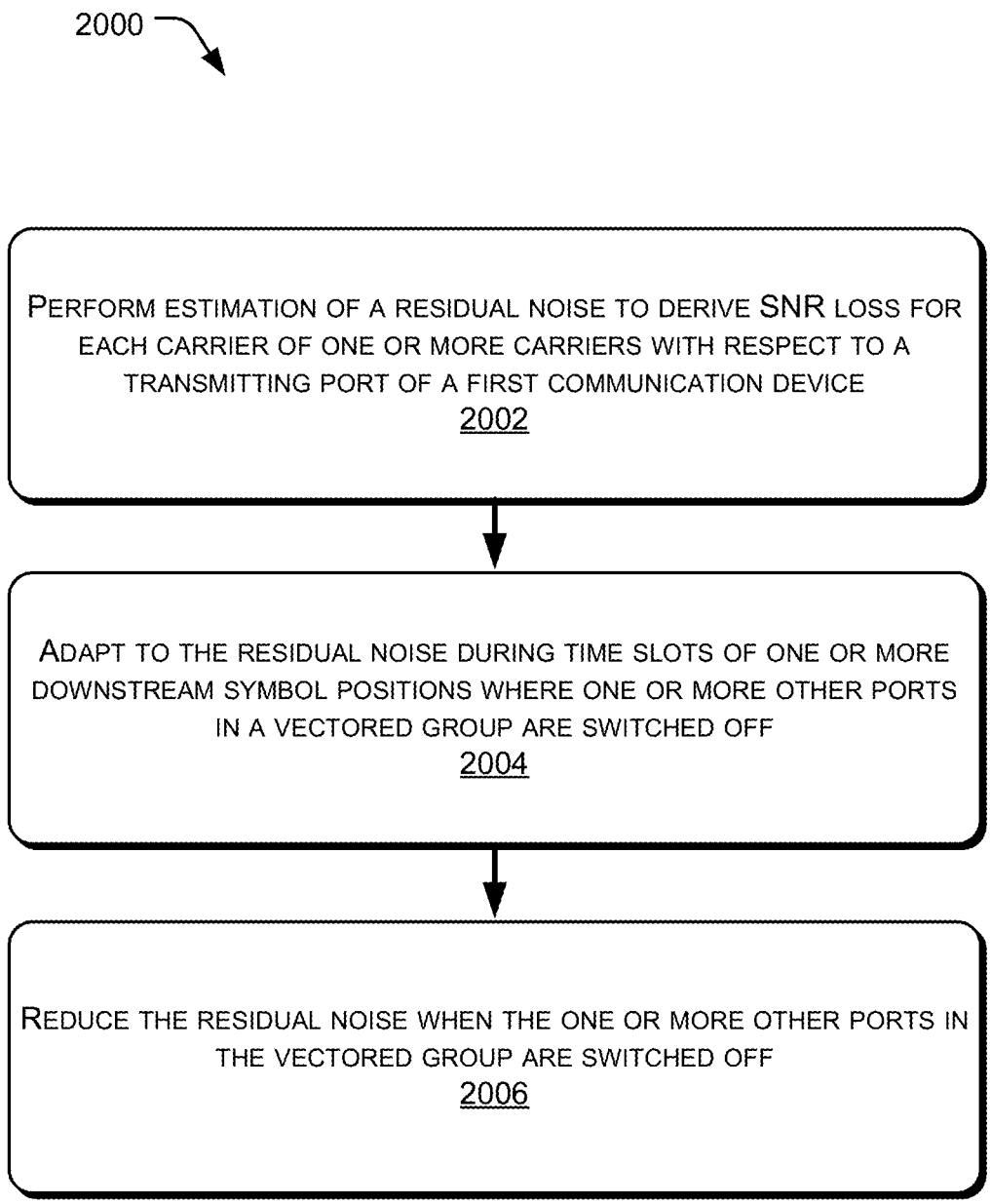
FIG. 20 is a flowchart of a process in accordance with an embodiment of the present disclosure.

FIG. 20 is a flowchart of a process 2000 in accordance with an embodiment of the present disclosure. Process 2000 includes one or more operations, actions, or functions as illustrated by one or more of blocks 2002, 2004 and 2006. Although illustrated as discrete blocks, various blocks may be divided into additional blocks, combined into fewer blocks, or eliminated, depending on the desired implementation. Process 2000 may be implemented by one or more processors including, for example, processor 1904 of communication device 1900. Moreover, some or all of the operations of process 2000 may be carried out by processor 1904. For illustrative purposes, the operations described below are performed by a first communication device, e.g., communication device 1900 as shown in FIG. 19.

At 2002, first communication device performs estimation of a residual noise to derive SNR loss for each carrier of one or more carriers with respect to a transmitting port of the communication device. The residual noise is an increased noise experienced by a second communication device (e.g., a receiver or customer premises equipment such as a FTU-R device) when one or more other ports in a vectored group of a plurality of ports of the communication device are switched off.

At 2004, first communication device adapts to the residual noise during time slots of one or more downstream symbol positions where the one or more other ports in the vectored group are switched off.

At 2006, first communication device reduces the residual noise when the one or more other ports in the vectored group are switched off.

In one embodiment, as part of process 2000, first communication device may perform estimation of the residual noise comprises generating an N by N matrix for each carrier in the transmitting port, wherein N indicates a number of ports in the vectored group.

In one embodiment, as part of process 2000, first communication device may signal to the second communication device changes in downstream bit-loading with a set of predefined rules.

In one embodiment, as part of process 2000, first communication device may determine one or more bit-loading tables that are different from each other, and transmit a TDD frame to the second communication device. The TDD frame may include a plurality of downstream symbols. One of the downstream symbols may include a robust management channel (RMC) symbol, the content of which is related to residual crosstalk management. In one embodiment, the RMC symbol indicates one of the one or more bit-loading tables for use by the transmitting port for each of the plurality of downstream symbols.

In one embodiment, as part of process 2000, first communication device may dynamically switch on or off one or more ports in the vectored group.

As an example, in a vectored G.fast system where downstream signals are processed in a precoder of a first communication device, e.g., a transmitter, transceiver or FTU-O device, in the frequency domain before OFDM symbols are formed by the Inverse-Fast-Fourier-Transformation (IFFT) where the precoder adds signals to each carrier in a way such that the crosstalk noises from other ports are canceled at a second communication device, e.g., a receiver or FTU-R device the receiver side. In one embodiment, the first communication device performs the following functions to adapt to dynamic on/off switching of downstream OFDM symbols of any combinations of ports in the vectored group of N ports.

The first communication device performs residual noise estimation to derive SNR loss for each carrier. The residual noise is the increased noise experienced by the receiver when the downstream symbols in one or more other ports in the vectored group are switched off. Based on the residual noise estimation, the first communication device exchange messages with the second communication device, e.g., a receiver or FTU-R device, to adapt to the residual noise during time slots corresponding to the downstream symbol positions where other ports in the vectored-group is turned off.

In one embodiment, the residual noise estimation may be represented by an N×N matrix for each carrier in one specific port.

In one embodiment, the adaptation to the residual noise may include: (1) generating one or more different bit-loading tables; and (2) signaling the FTU-R device changes in the downstream bit-loading with a set of predefined rule.

In one embodiment, a precoder in the first communication device may further include a mechanism to reduce the residual noise when the downstream symbols in other ports in the vectored group are switched off.

Additional Notes

Embodiments of the present disclosure are not limited to those described herein. The actual design and implementation of the proposed techniques, methods, devices and systems in accordance with the present disclosure may vary from the embodiments described herein. Those ordinarily skilled in the art may make various deviations and improvements based on the disclosed embodiments, and such deviations and improvements are still within the scope of the present disclosure. Accordingly, the scope of protection of a patent issued from the present disclosure is determined by the claims as follows.

In the above description of exemplary implementations, for purposes of explanation, specific numbers, materials configurations, and other details are set forth in order to better explain the present disclosure, as claimed. However, it will be apparent to one skilled in the art that the claimed subject matter may be practiced using different details than the exemplary ones described herein. In other instances, well-known features are omitted or simplified to clarify the description of the exemplary implementations.

What is claimed is:

1. A method implemented in a time division duplexing (TDD) orthogonal frequency-division multiplexing (OFDM) communication system where a vectoring technique is used to cancel the Far-End-Crosstalk as described in ITU-T G.9701 (G.fast), comprising:
   establishing, by a first communication device having a plurality of transmitting ports transmitting in a downstream direction, communication with a plurality of second communication devices which are connected to at least one or all of the plurality of transmitting ports of the first communication device by a crosstalk-coupled channel forming a vectored group, wherein a precoder in the first communication device injects compensation signals to the plurality of transmitting ports so that signals received at the second communication devices are crosstalk-free;
   performing, by the first communication device, estimation of a residual noise to derive signal-to-noise ratio (SNR) loss for each carrier of one or more carriers with respect to at least one transmitting port of the plurality of transmitting ports of the first communication device, wherein the residual noise is an increased crosstalk noise experienced by one of the second communication devices when one or more other transmitting ports of the first communication device are switched off; and
   adapting, by the first communication device and the one of the second communication devices, to the residual noise during symbol positions where the one or more other transmitting ports are switched off by using one or more bit-loading tables that are different from each other and different from a perfect bit-loading table which is derived from an assumption of a complete crosstalk cancellation in the vectored group.

2. The method of claim 1, wherein performing estimation of the residual noise comprises generating an N by N matrix for each carrier in the transmitting port, wherein N indicates a number of ports in the vectored group.

3. The method of claim 1, wherein adapting to the residual noise comprises:
   signaling, by the first communication device, to the one of the second communication devices changes in downstream bit-loading with a set of predefined rules.

4. The method of claim 1, further comprising:
   reducing, by the first communication device, the residual noise when the one or more other ports in the vectored group are switched off.

5. The method of claim 1, further comprising:
transmitting, by the first communication device, a time-division duplexing (TDD) frame to the one of the second communication devices.

6. The method of claim 5, wherein the TDD frame comprises a plurality of downstream symbols, wherein one of the downstream symbols comprises a robust management channel (RMC) symbol, and wherein a content of the RMC symbol is related to residual crosstalk management.

7. The method of claim 6, wherein the RMC symbol indicates one of the one or more bit-loading tables for use by the transmitting port for each of the plurality of downstream symbols.

8. The method of claim 1, further comprising:
dynamically switching, by the first communication device, on or off one or more ports in the vectored group.

9. The method of claim 2, wherein the generating of the N by N matrix comprises generating the N by N matrix based at least in part on information of a precoder, information that derives the precoder, or a derivative of the precoder.

10. The method of claim 4, wherein the reducing of the residual noise comprises performing a precoder matrix inversion approximation with one or more ports in the vectored group turned off.

11. The method of claim 1, wherein at least one of the one or more bit-loading tables is configured to group multiple carriers to share one entry.

12. The method of claim 11, wherein at least one of the one or more bit-loading tables is configured to group the multiple carriers such that a grouping of the multiple carriers is evenly distributed.

13. The method of claim 12, wherein the grouping of the multiple carriers is predefined and exchanged between the first communication device and the one of the second communication devices.

14. The method of claim 1, wherein a calculation of the residual noise and the SNR loss is performed before any of the transmitting ports of the first communication device is switched off.

* * * * *